US009810196B2

(12) United States Patent
Rahmanifar

(10) Patent No.: US 9,810,196 B2
(45) Date of Patent: Nov. 7, 2017

(54) HYDROSTATIC MOTOR AND METHOD FOR OPERATING A HYDROSTATIC MOTOR

(75) Inventor: Majid Rahmanifar, Munich (DE)

(73) Assignee: Maijid Rahmanifar, München (DE)

(*) Notice: Subject to any disclaimer, the term of this patent is extended or adjusted under 35 U.S.C. 154(b) by 903 days.

(21) Appl. No.: 14/003,069

(22) PCT Filed: Mar. 5, 2012

(86) PCT No.: PCT/EP2012/053764
§ 371 (c)(1),
(2), (4) Date: Dec. 2, 2013

(87) PCT Pub. No.: WO2012/119993
PCT Pub. Date: Sep. 13, 2012

(65) Prior Publication Data
US 2014/0079531 A1 Mar. 20, 2014

(30) Foreign Application Priority Data
Mar. 4, 2011 (DE) .......................... 10 2011 013 038

(51) Int. Cl.
*F03B 17/02* (2006.01)
*F03B 15/00* (2006.01)
*F03B 17/04* (2006.01)

(52) U.S. Cl.
CPC .............. *F03B 15/00* (2013.01); *F03B 17/02* (2013.01); *F03B 17/025* (2013.01); *F03B 17/04* (2013.01)

(58) Field of Classification Search
CPC .......... F03B 15/00; F03B 17/04; F03B 17/02; F03B 17/025; G09B 23/12; Y10S 415/916

(Continued)

(56) References Cited

U.S. PATENT DOCUMENTS 3,412,482 A * 11/1968 Kusmer ................. F03B 17/04
40/479
4,742,242 A 5/1988 De Shon

FOREIGN PATENT DOCUMENTS

| CA | 2437599 | 2/2005 |
| WO | WO 03/076798 | 9/2003 |
| WO | WO 2004/067952 | 8/2004 |

OTHER PUBLICATIONS

International Search Report and Written Opinion dated Jul. 6, 2012 for Application No. PCT/EP2012/053764.

(Continued)

*Primary Examiner* — Jason Shanske
*Assistant Examiner* — Kelsey Stanek
(74) *Attorney, Agent, or Firm* — Frost Brown Todd LLC

(57) ABSTRACT

Disclosed is a motor which uses a hydrostatic force to generate a torque which repeats cyclically owing to a displacement of the center of gravity of a cyclic unit. Float bodies (116) are subjected to a buoyant force in a fluid (134), which buoyant force causes an upward movement (146) of the float bodies and drives these into an upper position. The upward movement drives a drive element. The upward movement furthermore causes air to be forced from upper segments (102a, 102d) of a deformable element (100) into lower segments (102b, 102c), and as a result the center of gravity of the cyclic units which comprise the float bodies (116) and the deformable element (100) is raised above an axis of rotation (106). When the float bodies (116) have passed into the upper position thereof, said elevated center of gravity position permits a rotation of the cyclic units into the initial position thereof.

7 Claims, 10 Drawing Sheets

(58) Field of Classification Search
USPC ....... 415/1, 5, 7, 916; 60/495–507; 434/300; 446/153, 155; 40/479
See application file for complete search history.

(56) References Cited

OTHER PUBLICATIONS

English Translation of the International Search Report dated Jul. 6, 2012 for Application No. PCT/EP2012/053764.
International Preliminary Report on Patentability dated Jul. 16, 2013 for Application No. PCT/EP2012/053764.
English Translation of the International Preliminary Report on Patentability dated Jul. 16, 2013 for Application No. PCT/EP2012/053764.

* cited by examiner

HYDROSTATIC MOTOR AND METHOD FOR OPERATING A HYDROSTATIC MOTOR

FIELD OF THE INVENTION

The present invention relates to the field of motors which provide mechanical output power.

BACKGROUND OF THE INVENTION

It is known that float bodies in liquids are subject to a buoyant lift force which, in accordance with Archimedes' principle, equals the weight of the liquid displaced by the float body.

SUMMARY OF THE INVENTION

There is a general requirement to find new sources for providing mechanical output power.

This requirement is addressed by means of the subjects of the independent patent claims. Advantageous embodiments of the subjects disclosed herein are described in the dependent claims.

According to a first aspect of the subjects disclosed herein, a motor is provided, wherein the motor is designed to generate a torque using a hydrostatic force, wherein the torque repeats cyclically owing to a displacement of the center of gravity of a cyclic unit.

This aspect of the subjects disclosed herein is based on the underlying concept of using a hydrostatic buoyant lift force to produce a torque which repeats cyclically owing to a displacement of the center of gravity of the cyclic unit.

In one embodiment, the motor comprises a drive element; wherein the cyclic unit has a float body; wherein the cyclic unit is arranged in a fluid such that the float body is, in a lower position, subject to a buoyant lift force which forces the float body in an upward movement into an upper position and thereby drives the drive element; and wherein the center of gravity of the cyclic unit, with the float body in the upper position, is situated above the drive element, and the center of gravity thereby drives the cyclic unit into an initial position in which the float body is in the lower position.

Thus, according to one embodiment of the subjects disclosed herein, there is provided a motor, the motor comprising: a drive element; a cyclic unit comprising a float body; wherein the cyclic unit is arranged in a fluid such that the float body is, in a lower position, subject to a buoyant lift force which forces the float body in an upward movement into an upper position and thereby drives the drive element; and wherein the center of gravity of the cyclic unit, with the float body in the upper position, is situated above the drive element, and the center of gravity thereby drives the cyclic unit into an initial position in which the float body is in the lower position.

According to one embodiment, the drive element is a drive output shaft of the motor. According to a further embodiment, the float body is a dimensionally stable float body, for example a dimensionally stable hollow body. According to one embodiment, the density of the float body is lower than the density of the fluid.

The fluid may for example be a liquid. Furthermore, use may be made of any other fluid medium which has characteristics similar to liquid and which is in particular capable of generating a buoyant lift force on the float body.

According to a further embodiment, the cyclic unit comprises a deformable element which has a fill medium, wherein a float body (for example the float body described in the preceding embodiments) and the deformable element are arranged in the fluid such that the float body compresses a first part of the deformable element during the upward movement, wherein the first part is arranged above the float body; and the compression of the first part of the deformable element forces the fill medium into a second part of the deformable element, wherein the second part is arranged below the float body. Consequently, the first part of the deformable element is compressed when the float body is situated in the upper position. According to one embodiment, the deformable element filled with the fill medium has a lower (or, in another embodiment, a higher) average density than the float body. In one embodiment, the deformable element is an air bag. In a further embodiment, the deformable element is a balloon, for example a balloon with two or more segments which, in one embodiment, are generally referred to as wings. In a further embodiment disclosed herein, the segments are referred to as air chambers.

It is self-evident that the expressions upward, downward, upper position and lower position used herein relate to the direction of gravity or the direction of the buoyant lift force. Thus, an upward direction, or upward in general, refers to a movement in the direction of the buoyant lift force in the liquid, and a downward direction generally refers to a direction opposite to the direction in which the buoyant lift force acts in the liquid.

The deformable element provides a facility for displacing the center of gravity during the upward movement of the float body, so as to result, when said float body is in the upper position, in a center of gravity of the cyclic unit situated above the drive element. The cyclic unit is therefore subject to an effective force which acts downward, that is to say counter to the buoyant lift force. For example by locking the float body to the cyclic unit, it can be achieved that the float body is driven together with the cyclic unit into the initial position owing to the high center of gravity.

In a further embodiment, the float body can, in the upper position, be locked to the deformable element, thus resulting in a locked state of the cyclic unit, wherein the center of gravity of the cyclic unit in its locked state, with the float body in the upper position, is situated above the drive element, and the center of gravity thereby drives the cyclic unit into the initial position. In one embodiment, the float body can be locked to the first part of the deformable element, wherein the first part is compressed when the float body is situated in the upper position. As a result of the locking of the float body to the cyclic unit, a situation is avoided in which the float body remains in the upper position. Rather, as a result of the locking, it is achieved that the float body moves as a unit together with the deformable element. In this way, it is reliably possible to achieve the initial position of the cyclic unit. In one embodiment, the locking of the float body to the deformable element is such that the external shape of the deformable element is fixed. It is self-evident that the fixing of the external shape of the deformable body is not possible in an exact mathematical sense. Rather, the fixing of the external shape can generally be achieved insofar as the external shape remains substantially unchanged. In a further embodiment, the motor may comprise a locking mechanism for locking the float body to the deformable element, by means of which locking mechanism the float body, when in its upper position, can be locked to the deformable element.

In a further embodiment, at least one of the float body and the deformable element is or can be coupled to the drive element in order thereby to exert a force on the drive element during the upward movement of the float body.

In a further embodiment, the motor has a coupling device which is designed for coupling the float body to the drive element during the upward movement of the float body, in order thereby to drive the drive element, in particular in order to drive the drive element in a drive direction. In a further embodiment, the coupling device is designed for decoupling the float body from the drive element as required. For example, in the case of certain configurations of the cyclic unit, such a decoupling may be necessary under certain conditions, for example during the driving of the cyclic unit into the initial position. In this way, it is made possible for the float body to be moved, counter to the upward movement, into the lower position without driving the drive element counter to the drive direction. For example, if the drive element is a drive output shaft which is set in a rotational movement with a predetermined direction of rotation by the upward movement of the float body, it is possible by means of the coupling device, or the decoupling of the float body from the drive element, for the driving of the float body into the initial position to take place oppositely to the predetermined direction of rotation.

In a further embodiment, the drive element is a rotatable element which has an axis of rotation; and the deformable element and the float body are configured to rotate conjointly about the axis of rotation during the driving of the cyclic unit into the initial position. Then, in the initial position, the first part of the deformable element is arranged relative to the float body such that the first part of the deformable element is arranged below the float body during a (new) upward movement of the float body. In the initial position itself, the first part of the deformable element may be arranged adjacent to the float body. Furthermore, for example in a configuration in which two cyclic units are arranged adjacent one another and are operated synchronously, the first part of the deformable element may, in the initial position, be arranged between the float bodies of the two cyclic units.

In other embodiments, the coupling device may be designed for coupling the deformable element to the drive element rather than for coupling the float body to the drive element.

In one embodiment, the coupling device comprises coupling elements that are actuated by means of actuators, wherein the actuators are controlled by a control device. In other embodiments, the coupling device is formed by at least one freewheel. Depending on the configuration, two or more freewheels may be necessary to ensure the functionality described herein.

In a further embodiment, the motor also comprises a locking mechanism for locking the position of the float body relative to the deformable element during the joint rotation about the axis of rotation. For example, the locking mechanism may have a locking element (for example at least one projection) on one of the float bodies and on the deformable element, and a second locking element, which can be placed in engagement with the first locking element, on the other of the float bodies and on the deformable element. For example, the connecting part may, for the conjoint rotation of the float body and of the deformable element, be placed in engagement with a projection on the float body and also with a projection on the deformable element in order to fix the position of the float body relative to the deformable element during the conjoint rotation about the axis of rotation. The placing of the first and second connecting elements into engagement may for example by means of a mechanical device, which is actuated by the movement of the float body or of the drive element, or by an actuator which is controlled by a control device. In one embodiment, the locking mechanism is also configured for unlocking the float body and the deformable element, thereby permitting an upward movement of the float body. That is to say, after the unlocking of the float body and of the deformable element, the float body can, as described above, perform the upward movement into the upper position again and thereby drive the drive element.

In a further embodiment of the subjects disclosed here, the motor comprises two or more cyclic units as described herein. For example, in one embodiment, the motor comprises the cyclic unit described above as a first cyclic unit, and also has a second cyclic unit which is configured in the manner of the cyclic unit as per one of the embodiments described herein. In a further embodiment, the second cyclic unit is formed analogously to the first cyclic unit. In a further embodiment, the first cyclic unit and the second cyclic unit are configured for conjoint rotation about a common axis of rotation. For example, in one embodiment, the drive element of the first cyclic unit and the drive element of the second cyclic unit may be formed coaxially. In a further embodiment, the second cyclic unit is formed mirror-symmetrically with respect to the first cyclic unit. For example, the two cyclic units may be arranged adjacent one another, wherein the float body moves in each case in a semicircular segment (segment which spans a semicircle) assigned to the respective cyclic unit.

If the motor has two or more cyclic units, the cyclic units may have common elements. For example, the locking mechanism for locking the position of the float body relative to the deformable element may be designed to fix the float bodies of two cyclic units relative to one another, for example by means of a rigid connection of the float bodies. In this way, the first parts, situated between the float bodies, of the respective deformable element of two cyclic units are fixed relative to one another, and the first parts are fixed relative to the float body of the respective cyclic unit. In a further embodiment, the two or more cyclic units have a common deformable element.

In a further embodiment, a further locking mechanism is provided by means of which the cyclic unit can be spatially fixed. Said spatial fixing of the cyclic unit permits an upward movement of the float body but prevents the cyclic unit from rotating owing to a displacement of the center of gravity. By unlocking said further locking mechanism, the cyclic unit can be rotated and thus placed into the initial position. In one embodiment, it is provided that the spatial fixing of the cyclic unit is released only when the position of the float body is locked (fixed) relative to the deformable element.

In a further embodiment, the drive element of the first cyclic unit and the drive element of the second cyclic unit are coupled via in each case one drive path to a gearing, wherein the gearing can be operated so as to combine the movement of the drive element of the first cyclic unit and the movement of the drive element of the second cyclic unit. For example, in one embodiment, the drive element of the first cyclic unit is coupled to the gearing via one drive strand, and the drive element of the second cyclic unit is coupled to the gearing via a second drive strand. In one embodiment, the gearing is a planetary gear set, wherein the first drive strand is coupled to one out of a sun gear, a planet carrier or an internal gear of the planetary gear set, the second drive strand is coupled to another out of the sun gear, the planet carrier or the internal gear, and a drive output shaft of the planetary gear set is coupled to the remaining one out of the sun gear, the planet carrier and the internal gear. In one embodiment, the drive element of the first cyclic unit is formed by one out of a sun gear, a planet carrier or an internal gear of the planetary gear set. Furthermore, the drive element of the second cyclic unit may be formed by another out of the sun gear, the planet carrier or the internal gear, and a drive output shaft of the planetary gear set is coupled to the remaining one out of the sun gear, the planet carrier and the internal gear.

In another embodiment, the gearing comprises freewheels and/or coupling elements, wherein the coupling elements are, in one embodiment, actuated by actuators in order to combine the movement of the drive elements to give a continuous movement of a drive output shaft of the gearing.

In one embodiment, the density of the fill medium is lower than the density of the fluid. For example, the fill medium is, in one embodiment, a gas, for example air.

In one embodiment, the motor is a gravity conversion system (GCS). For example, the motor is a "multi-body system" composed of the combination of a system and of the fluid into which the system is immersed. In one embodiment, the system generates its drive force from the buoyant lift of two floats of the cycling element.

Some embodiments and features of such a system will be described below.

In one embodiment, the main body is balanced in terms of volume and weight and is cylindrical. The floats are driven upward by the water owing to an artificially produced bielementary density gradient. Aside from the main body of the system, a fluid chamber serves as one component of the density gradient. The gradient is substantiated by the main body having a significantly lower density than that of the fluid. The fluid chamber offers a reasonable size and depth, and its characteristics meet the requirements with regard to function and accommodation of the system. As a result of the fact that the system, together with its main body, remains below the fluid surface, that is to say remains immersed in the fluid, throughout operation, the gradient also exists continuously. The floats that serve as a drive element of a GCS system are—as the lighter components of a density gradient—driven directly by the fluid. The gradient generated by the float bodies in the water is bielementary and is not based on temperature. As a result of the fact that the gradient is in this case produced artificially, the repetition of the buoyant lift action of a GCS system must also be provided for through technical intervention.

This object encompasses a set of complex problems and difficult demands which, within the context of the GCS concept, have been broken down into individual components and overcome through the use of relevant principles and by means of specially developed constructions in different development steps. The gravity conversion system profits from a complex use of fluid-induced buoyant lift which, from quasi-static movements controlled in a state-by-state manner, generates a cyclic rotation.

The mode of operation of an exemplary GCS system with water as a fluid will be described below. It is however self-evident that any other suitable liquid may be used.

To obtain energy from water-induced buoyant lift, a float body must firstly be immersed in the water. This consumes at least as much energy as can then be obtained through the buoyant lift of the float body. A float body driven upward by water conventionally does not go beyond a partial rotation. Owing to its lower density, the float body—mounted on an axle—continues to be pushed only upward by the water after the top point of the circle is reached. As a result, an attempt at realizing an axle drive remains unsuccessful. Furthermore, the buoyant lift of a float body in the water exists only for as long as the gradient exists. Thus it is unquestionable that no energy can be gained merely from water-induced buoyant lift in the conventional way. The considerable water-induced buoyant lift that can be generated by means of a bielementary gradient has indeed hitherto been used only in simple applications for this reason.

Nevertheless, it would in theory be possible under corresponding preconditions for the effort required for immersing a float body to be outbalanced, and useful energy obtained therefrom, by means of a state-by-state repetition of the buoyant lift.

A conceivable repetition of the buoyant lift necessitates that the required boundary conditions for returning the float body into its initial position be integrated already into the generation phase of the buoyant lift. The solution to this complex problem is constituted by the GCS concept presented below as per one embodiment of the subjects disclosed herein, and the development of a system that functions in accordance therewith.

The buoyant lift of a float body in water is dependent on the density gradient (gradient principle, Archimedes). Said density gradient is eliminated when a float body reaches the water surface. From this, it follows that:

1. To obtain the gradient with respect to the water, the buoyant lift route of a float body, once it has been immersed in water, must run entirely below the water surface.

2. Furthermore, the float body must be returned to the initial point again after the end of each buoyant-lift pass.

3. It is crucial here that the return of the float body into the initial position does not lead to a negative energy balance.

Satisfying the above condition 1 requires that the system is operated underwater. This results in the need for the use of a water chamber, the depth of which is greater than the diameter of the buoyant lift circle. As a result, this can run permanently below the surface of the water if its position in the water chamber remains unchanged. This can be ensured by means of the fastening of the system to the base of the water chamber. In this way, it is ensured that the gradient is maintained.

Since the ultimate aim of the system is to produce a rotation, the vertical water-induced buoyant lift movement must be converted into a rotation by means of an axle. For a float with a geometric shape which is homogeneous and symmetrical, it is the case in one embodiment that the following relationships apply.

The buoyant lift of a float (float body) mounted on an axle occurs between $(-\pi/2+a)$ and $+\pi/2-a$, that is to say the rotational angle is $$\pi-(2a), \tag{1}$$

wherein ($\alpha$) is the—axle-side—half-angle of the float.

In the case of two floats being used which are mounted on the central axle of the system and which are subject opposingly to the water-induced buoyant lift action, the rotational angle is $$2x(+\pi/2-2a-(-\pi/2+2a))=2\pi-(4a), \text{ wherein } a \leq \pi/4$$
$$(\text{see below}) \ 2\pi-(4a) > \pi-(2a) \tag{2}$$

The functioning of the main body includes a rotation fully through 180° during each operating cycle. As a result of the shape of a cylinder, the main body has been imparted the characteristic of keeping the friction losses low during the rotations thereof.

As a constituent part of the main body, the peripheral float outline has been adapted to the rounding of the cylinder. Accordingly, the factor sin(2a) is a coefficient of the torque work imparted by the buoyant lift of a float. To maximize the work output, it must be the case that (sin(2a))=1. From this, it follows that (2a)=π/2, whereby it is then also defined that rotational angle (2)>rotational angle (1).

In view of these findings, two floats are used as a drive element of the system, which floats are mounted opposingly on the axle and have the shape of a quadrant of a cylinder. The use of two floats is also advantageous in later development steps.

Although the return of the floats into the initial position is not a technical challenge, simply returning the floats again via their buoyant lift route leads to a negative energy balance. Additional measures must thus be implemented which can counteract the outlay of energy.

To save energy, in accordance with the counterweight principle, an equivalent counterweight is used for the power-transmitting part. The counterweight provides a gravitational force equalization which places the power-transmitting part in a floating state (similarly to counterweights in the case of a lifting device, for example of a lifting bridge or a passenger lift).

Whereas the power of a lifting device lies in the lifting of loads, wherein the task is to overcome gravity, the floats are driven upward by the gravitational force difference. It is precisely this gravitational force difference with respect to the water that must be overcome during the return movement of the floats. In other words, it is necessary here to create an equalizing force equivalent to the buoyant lift force of the floats, that is to say a counteracting buoyant lift. A buoyant lift equalization for the floats is generated by means of a volume element equivalent to the floats. In order that the buoyant lift of the floats is however not counteracted, the volume element must have the flexibility to be converted in a manner adapted to the float buoyancy. Resorting to technology external to the system in order to solve this problem is not expedient owing to the energy outlay limits that must be adhered to. The solution must therefore be created within the configuration possibilities that exist in the water.

To solve this complex problem, a cylindrical air bag has been developed. In view of the possibilities that are expedient owing to the existence of two floats, the air bag has been constructed from four chambers with a deformable skin, wherein each of the chambers has the same weight and approximately the same volume as a float. The separation of the air bag into four chambers also yields advantages with regard to the continuity of the functioning of the air bag. The air bag is half-filled with air. As a result of the accommodation of the floats in the air bag, half of its volume is compressed. All of the air is then situated in the other half which will be situated opposite the floats as an equivalent volume element. The main body of the system is formed from the entirety of the air bag and the floats.

At the start of operation, the floats are situated at the bottom, and two chambers of the air bag are compressed between them. The other two chambers are expanded with air above the floats. As a result of the buoyant lift of the floats, the upper chambers must be compressed. This yields the following problems:

1. Another space is required into which the air content of the upper chambers is transferred.
2. The force outlay for the transfer of air must be allowed for.

To satisfy said requirements, there has been accommodated in the center of the air bag a passage chamber which serves as an air sluice. The air can flow between the chambers through the sluice. In accordance with the expansion principle, the air propagates uniformly into any available space in order to minimize the pressure. Accordingly, the air content of the upper chambers can, given the required force ratio, be transferred through the sluice into the lower chambers.

As regards the force, the chambers—as autonomously movable segments of the main body—are subject to water forces. At an overall depth of the main body of 1 m, the water pressure on the lower air chambers is three times as large as that on the upper chambers. Here, the upper top surface of the upper air chambers is at a depth of almost zero, and the base surface thereof is at a depth of 0.5 m. The result is thus an average depth of 0.25 m. By contrast, in the case of the lower chambers, the water depth is 0.5 m at the upper top surface, and 1 m at the base surface, which corresponds to an average of 0.75 m. In the case of an identical external surface area of the upper and lower chambers, said pressure difference has the effect that the water force on the lower chambers is, at 0.75 gpA, three times as large as that on the upper chambers, at 0.25 gpA. Here, g is the gravitational acceleration, ρ is the density and A is the respective area. Said force difference prevents the transfer of air from the upper chambers into the lower chambers and thus also prevents the floats reaching the intended end position. To circumvent this problem, the following measures are implemented:

Firstly, the opposite sides (surfaces) of the lower chambers are, during the buoyant lift movement of the floats, held locked by means of a fork mechanism described further below. In this way, the water pressure on these sides is repelled. Said water pressure is then rather borne by the fork mechanism which is installed on the frame.

In a second step, a complex mechanism which is developed specifically for this purpose and which is composed of solid and flexible elements, wherein the flexible elements are fastened to the edge of the chambers and can move partially through solid guides and can thereby have rigidity imparted thereto, is used to pull the skin of the chambers situated at the bottom taut, the weight of said skin likewise being borne by the frame. By means of this mechanism, the outer surface of the chambers is held taut for as long as said chambers are situated in the lower position. The water pressure is then repelled at the chamber outer surface and transmitted to the pulling-taut mechanism.

By means of this mechanism, the effect of the water pressure is eliminated, whereas the chambers situated at the top are subject to the full force of the water. Said chambers are thus compressed and force the air downward through the air sluice.

The air flowing into the lower chambers causes these to be inflated. The inflation takes place in that those sides (surfaces) of the lower chambers which are situated opposite the floats rotate out of their vertical position at an average depth of 0.75 m into the horizontal position at a depth of 0.5 m. Here, the water force acting on said sides must be overcome.

In view of a multiplication product, with compression effect eliminated, of the surface area and depth values of the upper chambers, said multiplication product being 1.7 times greater than that of the respective surface area of the lower chambers, a considerable excess force is generated on the side of the upper chambers, whereby the air is pressed into the lower air chambers. Force outlay for the air transfer is thus covered by the water force acting on the chambers themselves.

At the end of the buoyant lift phase, both floats are situated at the top. Two compressed air chambers are situated between them. Two air-filled air chambers are situated in the lower half of the main body.

At the end of a rotation cycle, the chambers that were situated at the top at the start have changed their position so as to be situated at the bottom. This however does not impair the function of the air bag because, with the change in position, a change in function between the chambers also occurs. The result is that the chambers, during the next cycle in each case, perform the function of the respective other chambers that they have replaced. The fact that this is possible is based on the design of the air bag. The air bag is homogeneous and symmetrical. Furthermore, the functionality of its four air chambers is not changed and is not impaired by the operation. At any time, two chambers are situated at the top, and two chambers identical thereto are situated opposite these at the bottom. The upper and lower chambers can thereby perform the same function alternately during the continuously successive rotation cycles.

The main body is formed from a combination of four air chambers and two floats. The mass of a float can be treated as equivalent to that of a chamber. In the rest position, two chambers are situated above the horizontal central line of the main body, and two chambers are situated below. In their initial position, the floats are situated adjacent one another at the bottom, and the two lower chambers are compressed between them. Ignoring the small air mass, there is thus twice as much mass situated at the bottom as there is situated at the top, for which reason the center of gravity is also situated in the lower half of the main body.

Since the floats can be subjected to buoyant lift from bottom to top by water, the center of gravity of the main body also moves with them. As a result of the upward movement of the floats, an increasing potential develops for the displacement of the center of gravity into the upper half of the main body, the maximum value of which is reached at the end of the buoyant lift phase of the floats.

The main body tends to turn over when the center of gravity passes into its upper half. This takes place as a result of the floats crossing the horizontal central line of the main body, that is to say after half of the buoyant lift travel has been covered, and thus considerably before the floats have reached their end position. In one embodiment, however, it would be possible for the system concept to work only when the floats have been lifted to their end position. Two aims are pursued in this way:

1. The buoyant lift power of the floats is fully utilized.
2. As a result of a rotation of the main body through half of a circle, the floats can then be returned into their initial position.

If the main body were to turn over halfway through the buoyant lift phase of the floats, both plans would fail. Operation would thus be ended. To prevent this, it would be necessary to prevent the main body, despite imbalanced gravitational action, from remaining stable, without this coming at the expense of other functional interests.

For this purpose, a complementary mechanism has been developed which is referred to below as fork mechanism. The fork mechanism was designed to hold the main body locked, and thus stable, until the end of the buoyant lift phase of the floats.

At the end of their buoyant lift travel, the floats are situated at a point that constitutes vertically the exact opposite of their initial position. Therefore, they will return into their initial position again as a result of a 180° rotation.

By means of the fork mechanism, it is attained that the gravitational potential is accumulated up to the end of the float buoyant lift phase, but is retained. Only thereafter is said potential released and activated for a rotation of the main body.

A rotation through half of a circle would however be complete only if the center of gravity were not displaced during the rotation. As a result of water pressure, however, the floats would separate from one another halfway through the rotation of the main body. The air would flow partially out of the lower chambers into the upper chambers until a new equilibrium were established. This would have the effect that the floats would not reach their initial position.

To solve said problem, a locking mechanism has been used in order to hold the floats locked to one another during the rotation of the main body through half of a circle. In this way, the risk of a displacement of the center of gravity is eliminated. The rotation of the main body through half of a circle can thus be completed, whereby the floats are placed into their initial position again.

In order that the rotation of the main body does not exceed 180°, in one embodiment, there has been included in the concept of the fork mechanism the function of engaging beforehand on the lower half of the main body, which is on the upward path during the course of the rotation, in order to stop the main body at exactly 180° rotation. In the concept of the locking mechanism, it is provided that said locking mechanism likewise releases at exactly 180° rotation of the main body. Thus, the preconditions for the repetition of the buoyant lift are met.

According to a second aspect of the subjects disclosed herein, there is provided a method for operating a motor as per the first aspect or an embodiment thereof, the method comprising: spatially fixing the cyclic unit in the initial position; subsequently releasing the float body in the lower position in order to enable the float body to perform the upward movement to the upper position and thereby drive the drive element; with the float body in the upper position, placing the cyclic unit into a locked state in which the float body is spatially fixed with respect to the cyclic unit; and releasing the cyclic unit in order to enable the cyclic unit to move into the initial position in which the float body is in the lower position.

In one embodiment, the method comprises the provision of control signals for actuators in order to effect the actions described herein, for example the spatial fixing of the cyclic unit, the release of the float body, the release of the cyclic unit, the fixing of the float body with respect to the fixing unit, etc.

According to a third aspect of the subjects disclosed herein, there is provided a computer program for providing a physical object, specifically a control signal, wherein the computer program is configured to carry out the method according to the second aspect, or an embodiment thereof, when said computer program is executed by means of a processor device.

Below, exemplary embodiments of the subjects disclosed herein will be described, wherein reference is made for example to a motor or to a method for operating a motor. It should be emphasized that any combination of features of different aspects, embodiments and examples as disclosed herein is possible. In particular, some embodiments are described with reference to a method, whereas other embodiments are described with reference to a device. In turn, other embodiments are described with reference to actuators which control functions of the motor or steps according to the method. It will however emerge to a person skilled in the art from the description above and from the description below, from the claims and from the drawings that, unless stated otherwise, features of different aspects, embodiments and examples may be combined in any desired manner. For example, a feature relating to a method may be combined with a feature relating to a device. As used herein, the reference to a computer program is intended to be equivalent to a reference to a program element and/or to a computer-readable medium which has instructions for the control of a computer system or of a processor device in order to effect and/or coordinate the execution of methods described herein.

The computer program may be implemented as computer-readable instruction code using any suitable programming language, such as for example Java or C++, and may be stored on a computer-readable medium (for example removable disk, volatile or non-volatile memory, embedded memory/processor, etc.). The instruction code can be executed in order to program a computer or any other programmable device in order to carry out the desired functions as described herein. The computer program may be available on a network, for example the World Wide Web, from which it can be downloaded.

Subjects and features as disclosed herein may be realized by means of a computer program, or software, respectively. Furthermore, subjects and features as described herein may be realized by means of one or more specific electronic circuits, or hardware, respectively. Furthermore, subjects and features as disclosed herein may be realized in a hybrid form, that is to say in a combination of software modules and hardware modules.

The aspects and embodiments defined above and further aspects and embodiments of the present invention will emerge from the examples described hereinbelow, and will be explained with reference to the drawings, to which the invention is however not restricted.

DETAILED DESCRIPTION

Figure 1:
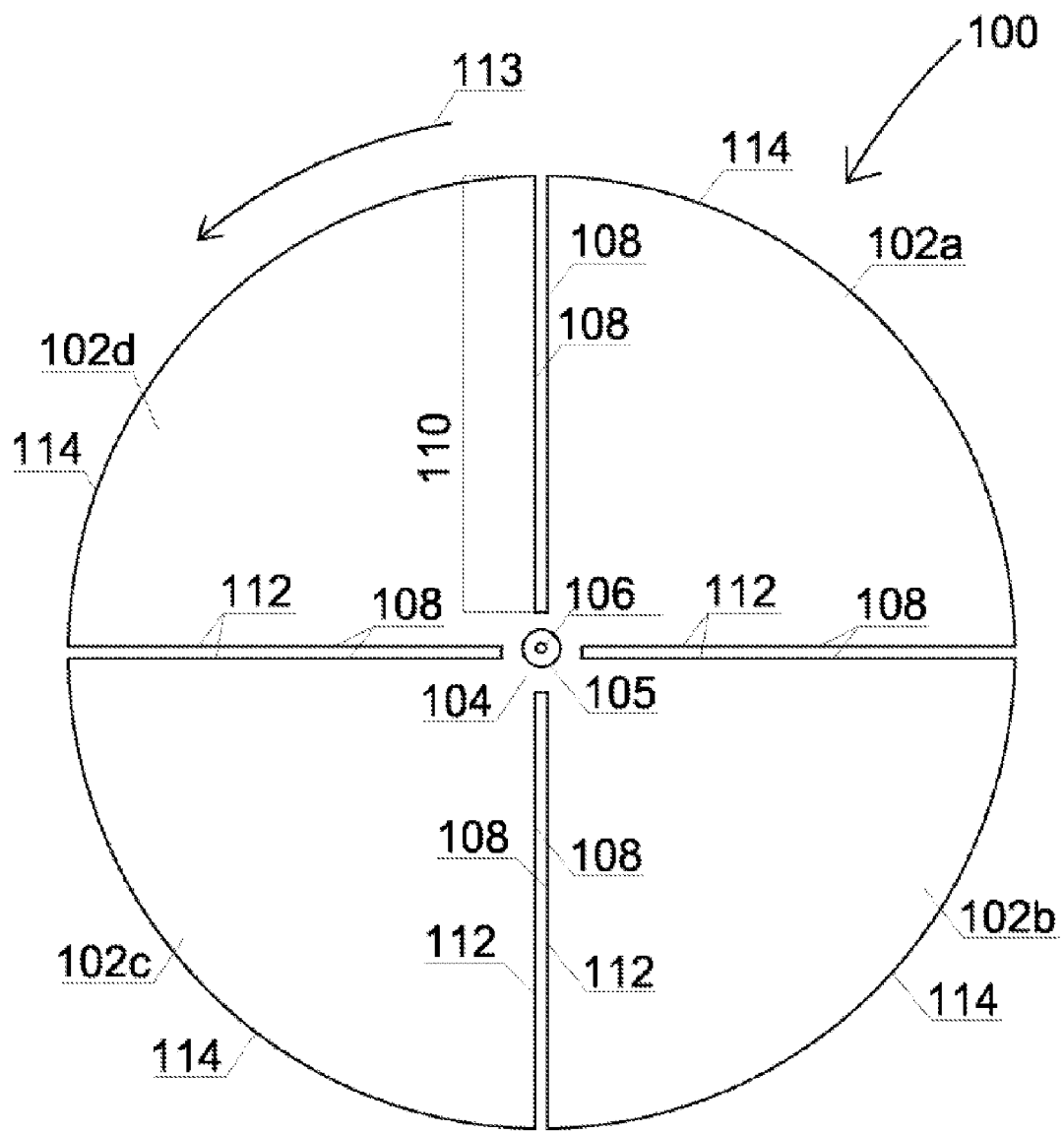
FIG. 1 shows an end view of a deformable element as per embodiments of the subjects disclosed herein.

The illustration in the drawings is schematic. It is pointed out that, in different figures, similar or identical elements or components are denoted by the same reference numerals or with reference numerals which differ only by the first number or by an appended letter. Such features and components which are identical or at least functionally identical to the corresponding features or components in another figure will be described in detail only upon the first occurrence thereof in the following text, and the description will not be repeated in the event of further occurrences of said features and components (or of the corresponding reference numerals). In some figures, elements have been omitted in order to make the illustration clearer. Consequently, an omission of an element in a figure does not mean that the element is not actually present.

Below, with reference to the drawings, a motor as per embodiments of the subjects disclosed herein will be described. For this purpose, individual elements of the motor will be described in terms of their configuration and function, and subsequently, a description will be given of the interaction of said elements in accordance with illustrated embodiments of the subjects disclosed herein.

As explained above, according to embodiments of the subjects disclosed herein, the motor is based on the use of a hydrostatic force for generating a torque which repeats cyclically owing to a displacement of the center of gravity of a cyclic unit.

For this purpose, the motor comprises a drive element and a cyclic unit, wherein, in one embodiment, the cyclic unit has a deformable element. In one embodiment, a common deformable element may be provided for two or more cyclic units.

FIG. 1 shows an end view of a deformable element as per embodiments of the subjects disclosed herein. In one embodiment, the deformable element is a compressible element. In one embodiment, the deformable element 100 is composed of a balloon which extends in a cylindrical form, wherein the balloon may have two or more wings. As illustrated in FIG. 1, the balloon 100 has four segments 102a, 102b, 102c, 102d which have a circular-segment-shaped cross section and which are connected to one another in terms of flow via a central region 104, such that a fill medium 103, for example air, can flow from any of the segments 102a-102d into another of the segments via the central region 104. The central region 104 also has a through hole 105 through which a drive element of the motor (not illustrated in FIG. 1) can extend. The four segments or wings 102a, 102b, 102c, 102d thereby form a closed cylinder body, wherein an axis 106 of the cylinder body extends perpendicular to the plane of the drawing and defines an axial direction.

Each of the segments 102a, 102b, 102c, 102d has side walls which extend in the axial direction and which separate the segments from one another in a circumferential direction at least in a radially outer region 110. In one embodiment, the deformable element 100 has a support device which defines the deformability of the deformable element. It may be provided, for example, that the deformable element is deformable in a circumferential direction 113 but is fixed in terms of its dimensions in a radial direction with respect to the axis 106. The support device may for example have frame rods which, in one embodiment, hold the side walls 108 in a taut state while permitting a movement of the side walls 108 relative to one another. In one embodiment, the frame rods extend in a radial direction with respect to the axis 106. The frame rods are denoted generally by 112 in FIG. 1.

In one embodiment, the frame rods 112 are arranged only in the region of the side walls 108. In other embodiments, further frame rods may also be provided which are arranged between the side walls 108 and which extend in the radial direction (not illustrated).

As explained, in one embodiment, the frame rods 112 serve to provide dimensional stability of the side walls 108. In this way, an outer wall 114, extending in the circumferential direction 113, of each segment is kept in shape. The further frame rods (not illustrated) between the side walls 108 may, in one embodiment, be designed to increase the dimensional stability of a segment 102a, 102b, 102c, 102d, and in particular to increase the dimensional stability of the side wall 114 or of an end-side wall.

In one embodiment of the deformable element 100, the side walls 108 and the outer wall 114, and an end-side wall not illustrated in FIG. 1, of the deformable element are produced from a flexible, that is to say bendable, material, for example a foil. In one embodiment, the foil exhibits only little or no elasticity in a plane of the foil, and rather is bendable only transversely with respect to the foil plane, without the foil hereby being elastically deformed. The foil may for example be a fiber-reinforced or fabric-reinforced foil.

In FIG. 1, the deformable element 100 in the form of the four-segment balloon is completely filled with air in order to facilitate an explanation of the configuration of the deformable element 100. In one embodiment of the subjects disclosed herein, the deformable element is however only partially filled with a fill medium 103. For example, in one embodiment, the deformable element 100 is half-filled with a fill medium 103, for example air.

Figure 2:
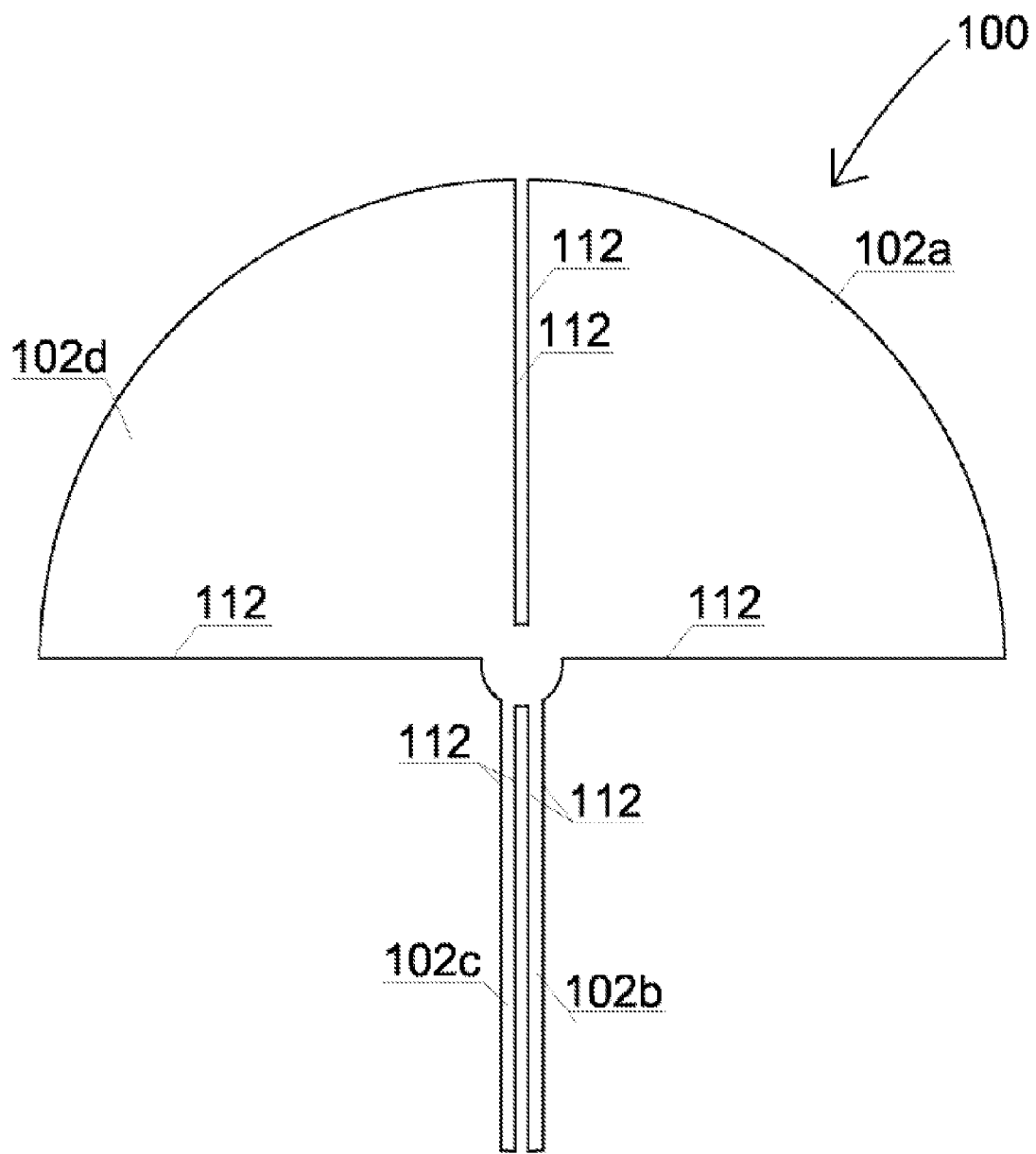
FIG. 2 shows the deformable element from FIG. 1 which has been half-filled with a fill medium.

FIG. 2 shows the deformable element 100 from FIG. 1, which has been half-filled with air as fill medium 103. This permits a configuration of the deformable element 100 in which, in FIG. 2, the two upper segments 102a and 102d are filled completely with the fill medium 103, whereas the two lower segments 102b, 102c are completely empty. The configuration of the deformable element 100 illustrated in FIG. 2 may be attained by compressing the lower segments 102b, 102c, the air content of which flows into the upper segments 102a, 102d, such that the upper segments 102a, 102d expand to the full volume. The reverse configuration is likewise possible. In one exemplary embodiment, the deformable element is an air balloon. In this case, the segments may be referred to as air balloon wings.

The segments 102a, 102b, 102c, 102d of the deformable element 100 are supported and guided by the frame rods 112 which, in one embodiment, extend along radial edges of the segments.

In an exemplary embodiment, a compressed segment 102a, 102b, 102c, 102d of the deformable element 100 has, without air content (compressed air balloon wing, KLBF), an average density of $\rho_{KLBF}=4000$ kg/m$^3$. That is to say, a compressed air balloon wing has a density higher than the density of water (approximately 1000 kg/m$^3$). By contrast thereto, an air-filled segment 102a, 102b, 102c, 102d (FLBF) has an average density of $\rho_{FLBF}=23$ kg/m$^3$. That is to say, the air-filled segment of the deformable element has a lower density than water.

In a further embodiment of the subjects disclosed herein, a cyclic unit has a float body adjacent to the deformable element 100.

Figure 3:
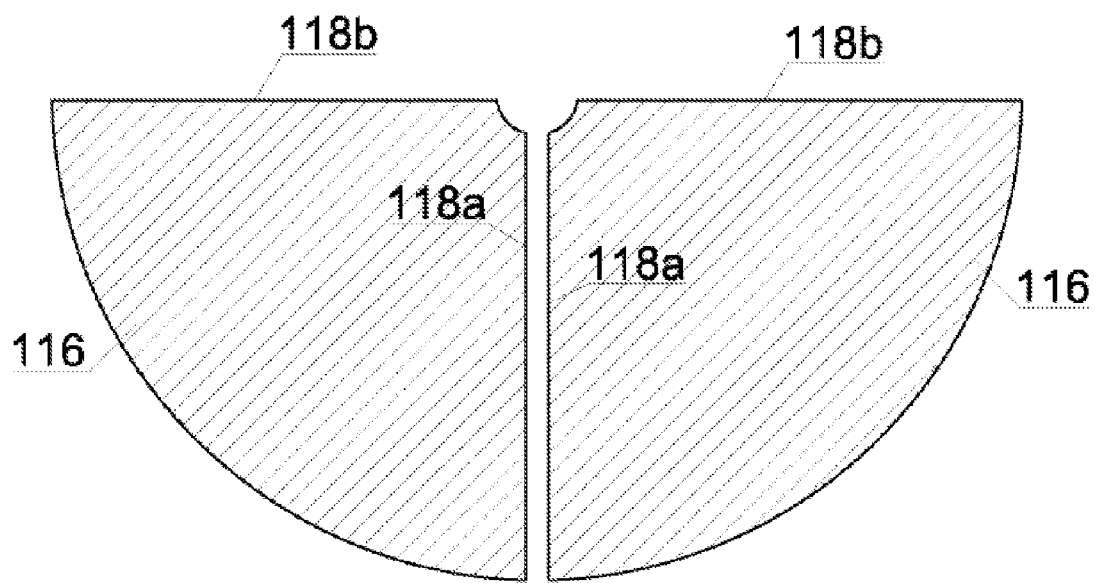
FIG. 3 shows two float bodies as per embodiments of the subjects disclosed herein.

FIG. 3 shows two float bodies 116 as per embodiments of the subjects disclosed herein. In one embodiment, the float bodies 116 are dimensionally stable float bodies. For example, the float bodies 116 may be produced from a rigid material, for example plastic or metal. In one exemplary embodiment, the float bodies 116 may be produced from Plexiglas.

In one embodiment, each float body 116 is dimensioned such that it can be positioned between an upper segment 102a, 102d and a lower segment 102b, 102c of the deformable element 100. For example, the float body 116 may have a circular-segment-shaped cross section. Even though, in FIG. 3, the cross section of the float body 116 has approximately the shape of a quadrant of a circle, this is merely exemplary, and the angle range between a first side wall 118a and a second side wall 118b of the float body 116 differs from 90°.

Figure 4:
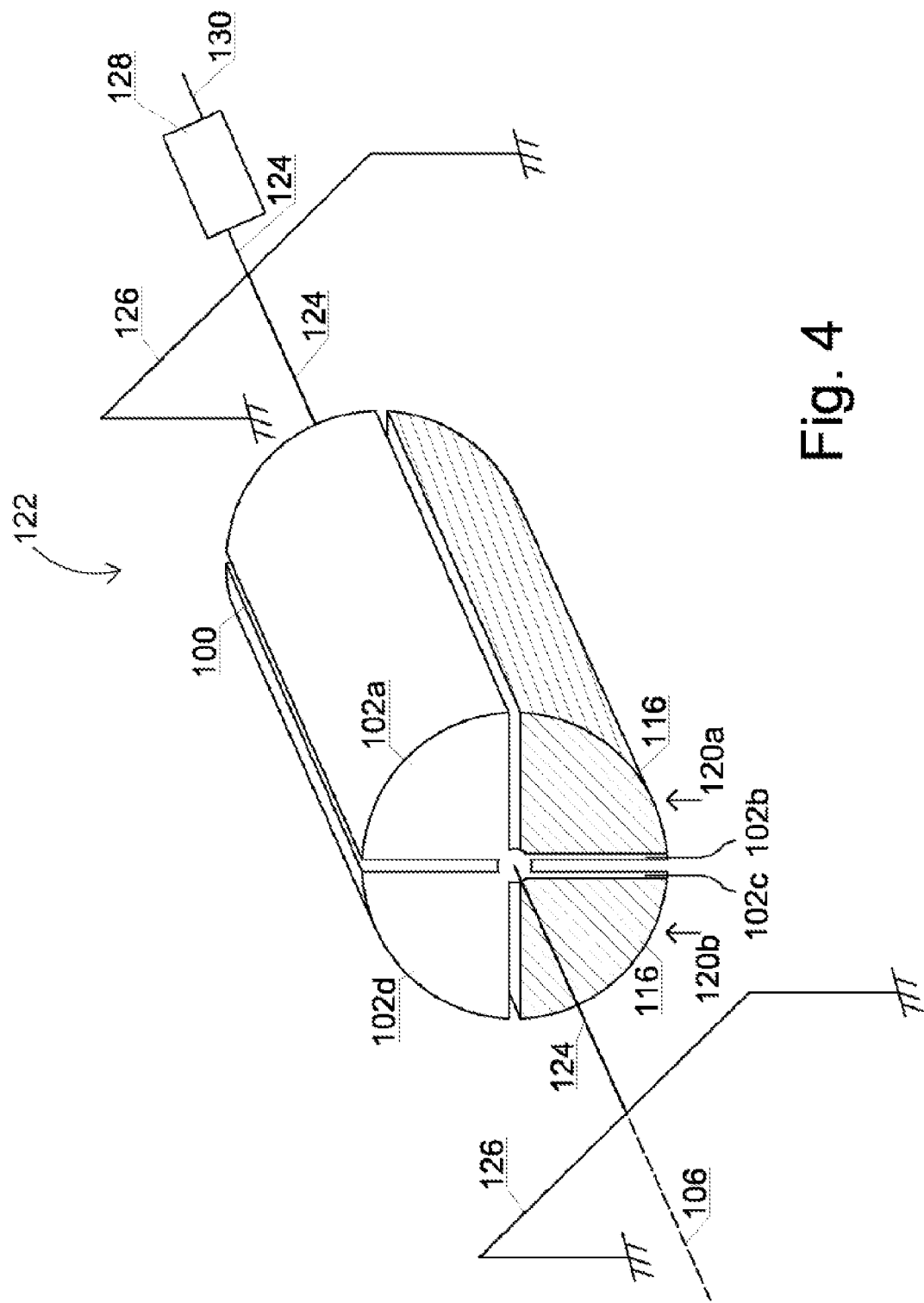
FIG. 4 shows the compressible element in the configuration from FIG. 2, together with the two float bodies as illustrated in FIG. 3, in a motor as per embodiments of the subjects disclosed herein.

FIG. 4 now shows the compressible element 100 in the configuration from FIG. 2, together with the two float bodies 116 as illustrated in FIG. 3, in a motor 122 as per embodiments of the subjects disclosed herein.

In one embodiment, the angle range over which the float body 116 extends and the angle range over which the two segments (102a, 102b and 102c, 102d respectively), arranged adjacent to the float body, of the deformable element 100 extend add up to 180 degrees, as illustrated in FIG. 4.

In the case of the motor 122 illustrated in FIG. 4, in each case two segments 102a, 102b and 102c, 102d respectively of the deformable element 100 form, together with the float body 116 arranged therebetween, a cyclic unit 120a, 120b or at least a part thereof.

In one embodiment, two or more cyclic units share a common deformable element, as illustrated in FIG. 4.

Each cyclic unit 120a, 120b is assigned a drive element, illustrated in FIG. 4 by a shaft unit 124, which bears the deformable element 100 and the float bodies 106. The shaft device 124 may be mounted in any suitable manner. By way of example, the mounting arrangement of the shaft device 124 is illustrated in FIG. 4 by 126.

In an exemplary embodiment, the float bodies, which may be formed as hollow bodies with rigid walls, have an average density of 106 kg/m$^3$.

In one embodiment, the segments of the deformable element are arranged spaced apart from the hollow bodies 116 in the circumferential direction 113. Consequently, in one embodiment, open gaps remain between the deformable element 100 and the float bodies 116. To maintain the spacing, spacer elements, such as for example projections or connecting elements which limit the minimum spacing between the float body 116 and the deformable element, may be arranged on the float bodies 116 and/or on the deformable element. In one embodiment, the opposite side walls 118a, 118b of the float body 116 and the side walls 112, situated opposite the side walls 118a, 118b, of the deformable element 100 are fixed to one another, for example by means of connecting elements (not illustrated). In another embodiment, the float bodies and the deformable element are not fixed to one another but rather are merely arranged adjacent to one another in order, during the operation of the motor described herein, to exert forces on one another corresponding to the respective operating state.

In one embodiment, the deformable float body has, in its central region 104, the through hole 105 illustrated in FIG. 1, through which the shaft device 124 extends.

In one embodiment, the frame rods 112 of the deformable element 100 are coupled to rings mounted rotatably on the shaft device 124. The coupling of the frame rods 112 to the rings is, in one embodiment, such that the frame rods 112 can tilt relative to the rings in the circumferential direction in order to permit a compression of the respective segment 102a, 102b, 102c, 102d. The rings (not illustrated) may be mounted on the shaft device 124 in a freely rotatable manner. In one embodiment, each float body 116 is coupled to its associated drive element by means of a coupling device. That is to say, in one embodiment, the transmission of force to the drive element takes place by means of the float body 116. In another embodiment, the float bodies 116 are mounted in a freely rotatable manner, and the transmission of force to the drive element of the cyclic unit takes place by means of the deformable element and/or the frame rods of the deformable element.

In one embodiment, the drive elements of the two cyclic units 120*a*, 120*b* in the form of the shaft device 124 in FIG. 4 are coupled to a gearing 128, wherein the gearing 128 is designed to combine the motion of the drive element of the first cyclic unit 120*a* and the motion of the drive element of the second cyclic unit 120*b*. It is self-evident that, in such a situation, the shaft device 124 must have two separate shafts in order to couple the drive elements of the two cyclic units 102*a*, 120*b* to the gearing. For example, in one embodiment, the shaft device comprises two shafts guided coaxially. The gearing 128 has a drive output shaft 130 at which the force or energy generated by the motor 122 is made available, for example for the purpose of driving a generator.

In one embodiment, the motor 122 may be used for driving a generator and thus generating electrical energy.

Following the description of the structural features of the motor 122, which corresponds to exemplary embodiments of the subjects disclosed herein, the mode of operation of the motor 122 will be discussed below.

Figure 5:
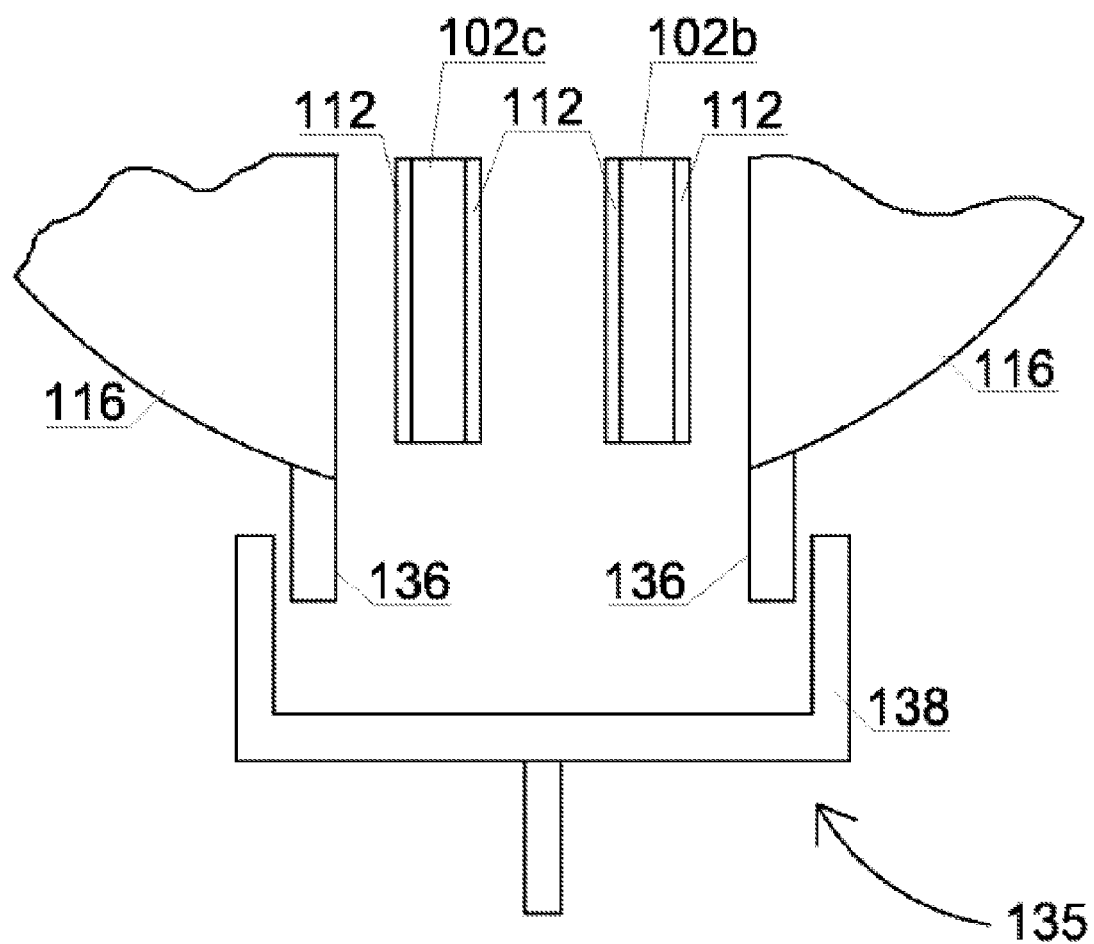
FIG. 5 shows a partial view of the motor from FIG. 4 as per embodiments of the subjects disclosed herein.

FIG. 5 shows a partial view of the motor 122 from FIG. 4 as per embodiments of the subjects disclosed herein. In one embodiment, the motor comprises a first locking mechanism 135 for locking the position of the float body 116 relative to the deformable element 100. For example, in the case of the motor 122 illustrated by way of example in the drawings, the first locking mechanism 135 may have, on each float body 116, a first locking element 136 which can be placed in engagement with a second locking element 138 in order to fix the position of the two float bodies 116 relative to one another. Since the compressed segments (segments 102*b*, 102*c* in the state of the motor 122 illustrated in FIG. 5) are situated between the float bodies 116, the fixing of the two float bodies relative to one another also has the effect that the compressed segments 102*b*, 102*c* arranged between the float bodies 116 are likewise fixed relative to one another (and also relative to the float bodies 116). In one embodiment, the position of the float body relative to the deformable element can be locked both when the first part (segment 102*a*, 102*d*) is compressed and also when the second part (segment 102*b*, 102*c*) of the float body is compressed. For this purpose, there may for example be provided two first locking mechanisms 135 (as illustrated in FIG. 8), of which however only one has been illustrated in FIG. 7 in order to simplify the illustration.

The first locking mechanism 135 may be a bistable mechanism which can assume two stable states. Thus, the first locking mechanism 135 may for example be designed to be locked by a first actuation and to be unlocked, after the cyclic unit has been transferred into the initial position, by a second actuation.

If the unfolded segments 102*a*, 102*d* are not elastically deformable, the fixing of the compressed segments 102*b*, 102*c* also results in the unfolded segments 102*a*, 102*d* being fixed. In addition, in a further embodiment, a further locking mechanism may be provided for fixing the unfolded segments 102*a*, 102*d* to one another. Said further locking mechanism (not illustrated) may be of analogous design to the first locking mechanism. In particular, the first locking mechanism and the further locking mechanism are part of the cycling element 120*a*, 120*b* and are movable together with the cycling element (for example, as per exemplary embodiments illustrated in the drawings, rotatable about the axis 106).

As illustrated in FIG. 5, the first locking element 136 may be composed in each case of a projection, and the second locking element 138 may be composed of a fork which engages around the projections 136 and thus fixes these relative to one another.

Below, a first drive cycle of the motor 122 will be described with reference to FIG. 6 to FIG. 9.

In one embodiment, the motor 122 is completely immersed in a fluid, for example water. That is to say, in one embodiment, the motor 122 is situated below a fluid surface 132 of a fluid 134.

Figure 6:
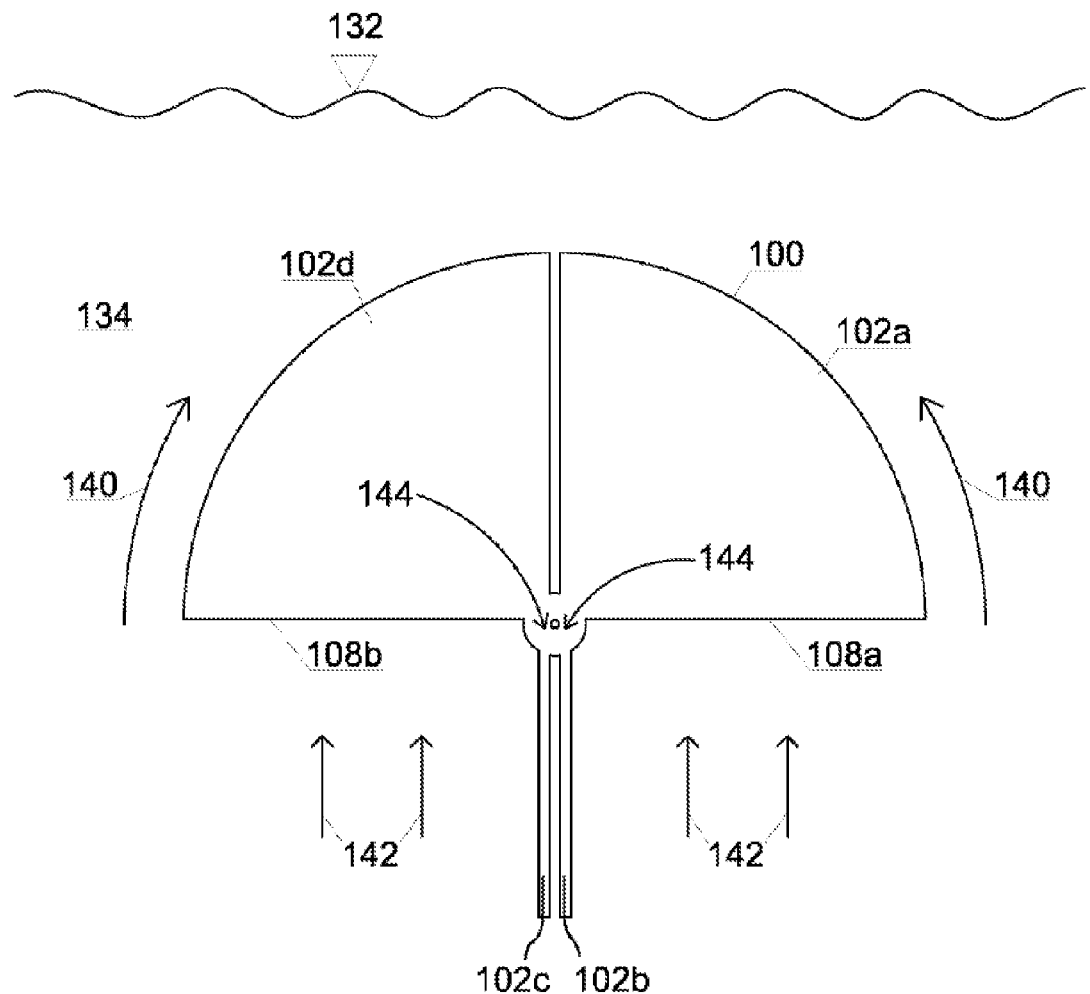
FIG. 6 shows the deformable element in an initial position of the cyclic unit as per embodiments of the subjects disclosed herein.

FIG. 6 shows the deformable element 100 in an initial position of the cyclic unit as per embodiments of the subjects disclosed herein, wherein the float bodies 116 are not illustrated in FIG. 6 for reasons of clarity.

The first drive cycle begins with an unlocking of the float body 116 and of the deformable element, for example by retraction of the second locking element 138 from the projections 136 (see FIG. 5; not illustrated in FIG. 6), whereby the float body and the lower segments 102*b*, 102*c* are released. The release of the float bodies 116 and of the deformable element 100 permits an unfolding of the lower segments 102*b*, 102*c*, that is to say a filling of the lower segments with air. In short, the configuration of the motor 122 has the effect that the water-induced buoyant lift exerted on the upper segments 102*a*, 102*b* causes a torque to act on the sides of the lower segments 102*b*, 102*c*. Said torque leads to the compression of the upper segments 102*a*, 102*d* and forces the fill medium 103 out of said upper segments into the lower segments 102*b*, 102*c*.

In more precise terms, a buoyant lift force acts on the lower side walls 108*a*, 108*b* of the upper segments 102*a*, 102*d* of the deformable element 100. This leads to an upward movement of the lower side walls 108*a*, 108*b*, wherein the upward movement is indicated in FIG. 6 by the arrows 140. The water pressure acting on the lower side walls 108*a*, 108*b* is indicated by 142.

The upward movement of the lower side walls 108*a*, 108*b* has the effect that the air is forced out of the upper segments 102*a*, 102*d* into the lower segments 102*b*, 102*c*. The resulting air flow is indicated by 144.

Figure 7:
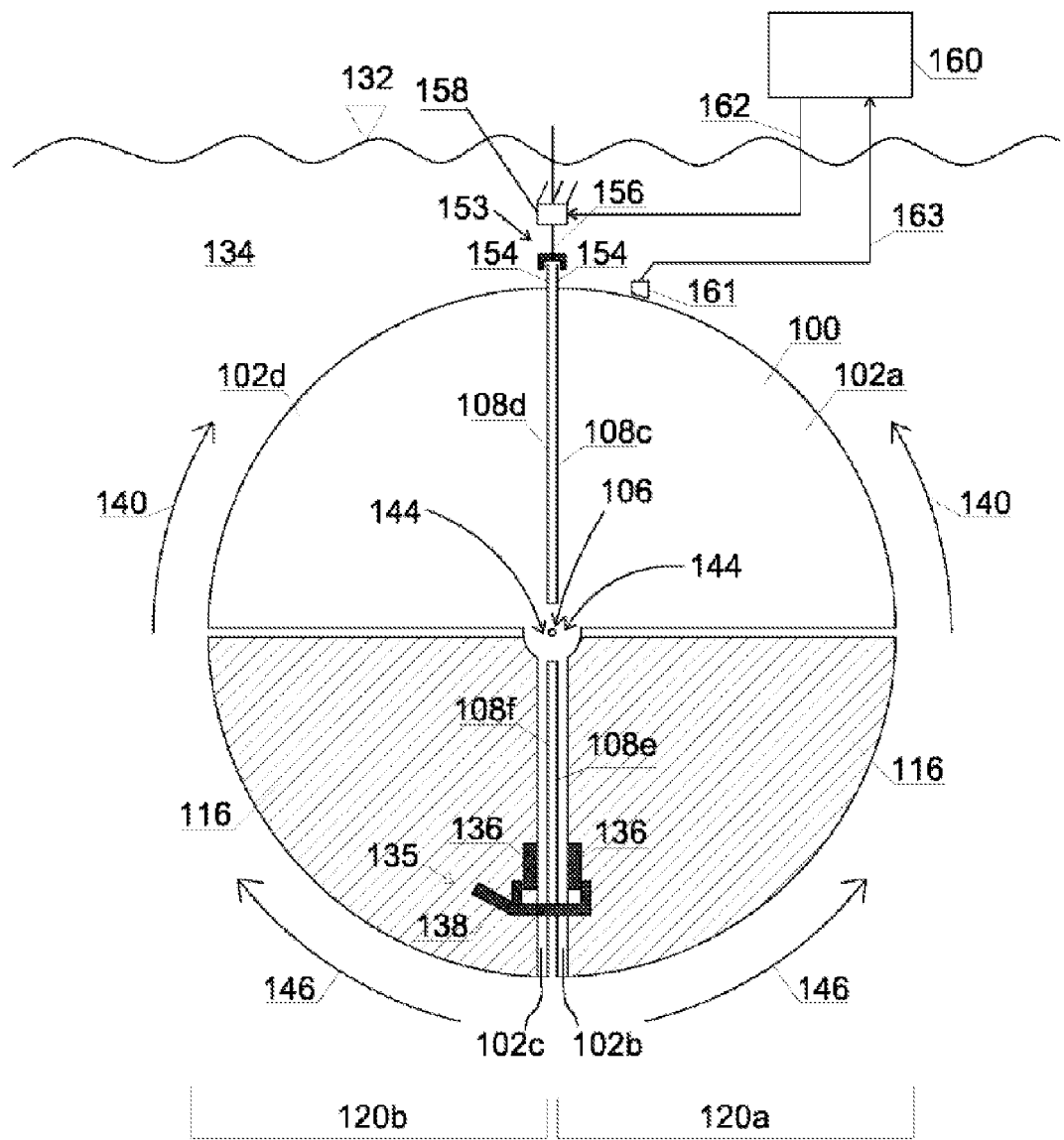
FIG. 7 shows the motor and in particular the deformable element in the state illustrated in FIG. 6, together with two float bodies.
Figure 8:
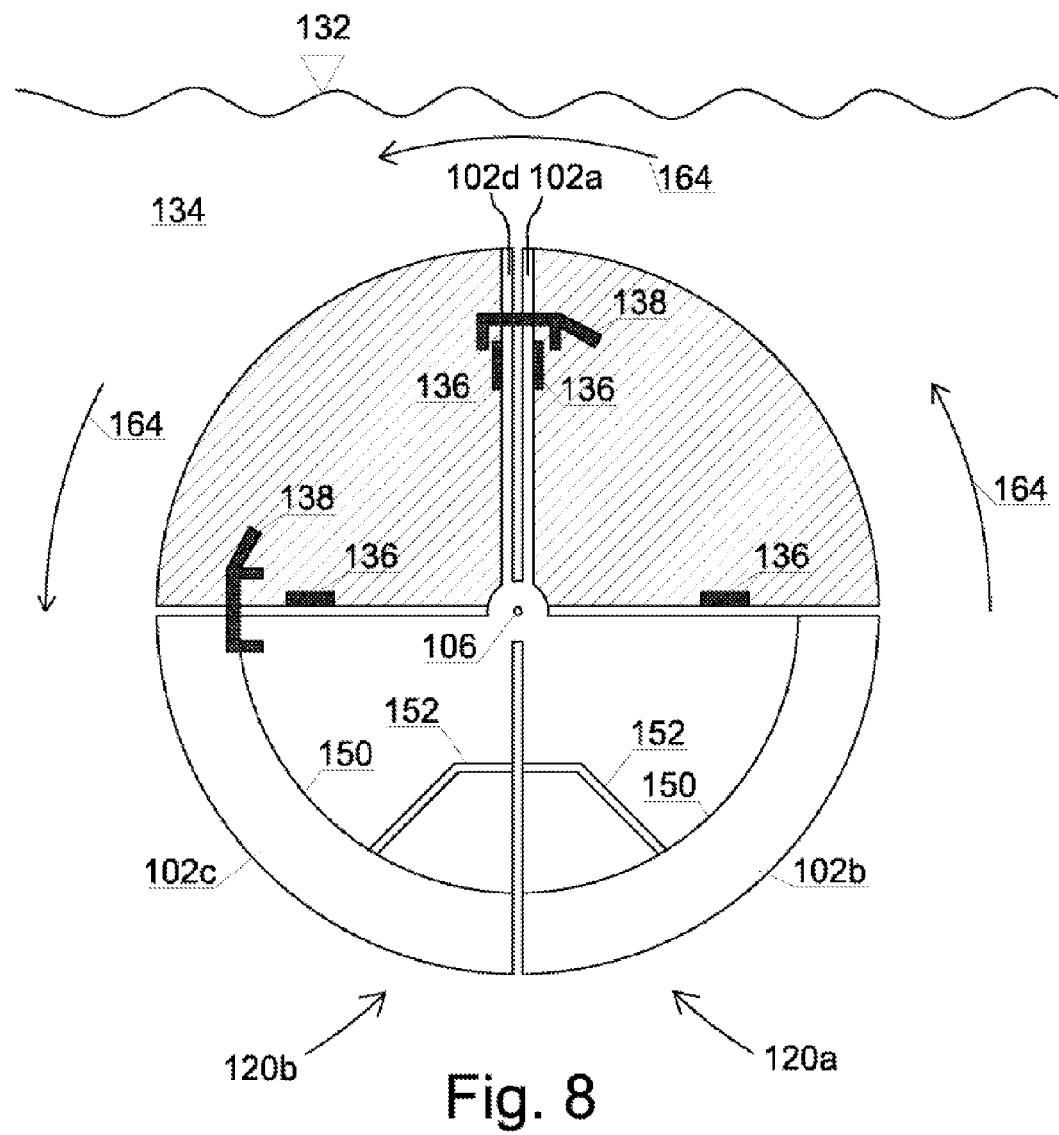
FIG. 8 shows the motor from FIG. 7 illustrated in a state in which the float bodies are situated in their upper position.

FIG. 7 shows the motor 122 and in particular the deformable element 100 in the state illustrated in FIG. 6, together with the two float bodies 116 which are arranged between the upper segments 102*a*, 102*d* and the lower segments 102*b*, 102*c*.

In addition to the first locking mechanism explained with reference to FIG. 5, there may be provided, in a further embodiment, a second locking mechanism 153 by means of which a pair of mutually opposite side walls 108*c*, 108*d* of two different segments 102*a*, 102*d* can be positionally fixed. In this way, the deformable element 100 can be spatially fixed, while the float bodies 116 remain movable. In one embodiment, a single second locking mechanism 153 is provided. In any case in the motor 122 illustrated by way of example in FIG. 7, this is sufficient, because the other two opposite side walls 108*e*, 108*f* are likewise fixed as a result of the configuration of the cyclic unit (degree of filling of the deformable element, and the shape of the float bodies adapted to the deformable element). In another embodiment, however, the motor 122 may also have a further second locking mechanism for the spatial fixing of a further pair of mutually opposite side walls, for example for spatially fixing the side walls 108*e*, 108*f*.

In one embodiment, the first locking mechanism 153 prevents an undesired rotation of the cyclic unit as a whole during the upward movement of the float bodies 116 into the upper position. Accordingly, in one embodiment, already in the state of the motor 122 illustrated in FIG. 6 and FIG. 7, at least one pair of mutually opposite side walls 108c, 108d and 108e, 108f respectively is locked in a positionally fixed manner by means of in each case one first locking element 154 and one second locking element 156. Here, in one embodiment, the second locking mechanism 153 comprises, as a first locking element, a projection 154 which is connected to the respective side wall 108c, 108d to be locked. Furthermore, the second locking mechanism 153 comprises the second locking element 156, for example in the form of a fork, which can be placed into a slid-forward position in which the second locking element 156 engages around the first locking elements 154 on the side walls and thereby spatially fixes these. To release the two side walls 108c, 108d, the second locking element 156 can be placed into a retracted position in which the second locking element 156 is not in engagement with the first locking elements 154. The first, locking position and the second, releasing position can be produced by means of an actuator 158 which can be controlled by means of a corresponding control signal 162 from a control device 160. In one embodiment, a sensor device 161 is provided which outputs a sensor signal 163 to the control device 160. In one embodiment, the control device 160 is designed to generate a control signal (for example the control signal 162) for at least one actuator of the motor in response to the sensor signal 163.

The first locking elements 136 of the first locking mechanism (see FIG. 5) and the first locking elements 154 of the second locking mechanism 153 may both be arranged in a radially outer circumferential region and be offset with respect to one another in an axial direction, such that an independent actuation of the first locking mechanism and of the second locking mechanism is possible. Other configurations are however likewise possible. For example, one locking mechanism, for example the first locking mechanism 135 by means of which the two float bodies can be fixed to one another, may be arranged on an end surface of the float bodies 116, as illustrated in FIG. 7.

As shown by way of example in the figures, the corresponding locking mechanisms 135, 153 may be actuated by means of controlled actuators. In other embodiments, the locking mechanisms are actuated purely mechanically, and are controlled by the movement of one or more elements of the cyclic unit and/or by the movement of the drive element of the respective cyclic unit.

Also, the float bodies 116 are subject to a buoyant lift force which, as a result of the coupling of the respective float body 116 to its drive element (not illustrated in FIG. 7), leads in one embodiment to a rotational movement 146 of the float body 116. The rotational movement 146 leads ultimately to an upward movement of the float body 116 from the lower position illustrated in FIG. 7 into an upper position illustrated in FIG. 8.

FIG. 8 consequently shows the motor 122 in a state in which the float body or the float bodies 116 are situated in an upper position, the upper segments 102a, 102d are compressed, and the lower segments 102b, 102c are filled with the fill medium 103.

In detail, in one embodiment, the expansion of the lower segments 102b, 102c takes place as follows: as a result of the inflowing air from the air flow 144 from the upper segments 102a, 102d, the lower segments 102b, 102c expand to an increasing extent, and the volumes thereof are correspondingly subjected to the water pressure. In one embodiment, a blocking device may be provided which prevents the already-expanded segment from being compressed again counter to the expansion direction by the water pressure. Such a blocking device may be realized for example by means of a toothed rack 150 and a pawl 152, wherein the pawl is preloaded in the direction of the toothed rack 150 and is thus in engagement with the latter. During an expansion movement (corresponding to the upward movement 146 of the float bodies 116), the pawl slides over detent lugs of the toothed rack 150, but a movement in the opposite direction is prevented by means of corresponding shaping of the pawl and of the detent lugs on the toothed rack 150. In other embodiments, however, the blocking device 150, 152 may be realized in any other desired way, for example by means of a freewheel or by means of an actuator which, in response to a sensor signal which indicates a movement counter to an expansion of the lower segments 102b, 102c, engages and thus prevents such an opposing movement. It is self-evident that, in one embodiment, the upper segments 102a, 102d may also have such a blocking device which is activated in order to impart the described blocking action and prevent an undesired opposing movement. Furthermore, a person skilled in the art recognizes that, in one embodiment, the blocking device may be deactivated in order not to exert the described blocking action and permit the opposing movement. The opposing movement is required for example during a compression of segments, for example during the compression of the upper segments. The activation/deactivation of the blocking device may be realized for example in purely mechanical form or by means of controlled actuators.

By means of the blocking device 150, 152, a situation is prevented in which the water pressure acting on the lower segments 102b, 102c acts as an opposing pressure counter to the air flow from the upper segments 102a, 102d. As long as they are at the lower position, the lower segments 102b, 102c rather transmit the water pressure as a torque to the float bodies 116. Since the total volume of the segments 102a, 102b, 102c, 102d remains unchanged, it is also the case, in end effect, that the sum total of the water pressure and thus also the sum of the torques thereby generated remains constant. As a result of the fact that the surface of the segments situated respectively at the bottom is held taut by the blocking device 150, 152, the system can generate additional force. If the skin of the segments situated at the bottom is held taut, the segments situated at the bottom behave as floats. They then take on a form whereby they are no longer deformable. As a result, the negative water pressure on the surface is repelled. Furthermore, the segments situated at the bottom are subject to buoyant lift, such as is the case with the float bodies. In fact, the water pressure that has previously deformed the lower segments and was a negative force is now converted into drive force, and the chambers situated at the bottom expand upward. This leads to an increase in power to a doubled value.

The sum of the torques acting on the float bodies 116 (that is to say torque on the float bodies 116 and torque on the lower side walls 108a, 108b of the upper segments 102a, 102d (see FIG. 6)) is transmitted to the respective drive element via the coupling device which couples the float bodies 116 to the associated drive element. As illustrated in FIG. 4, said torques at the drive elements can be supplied via the shaft device 124 to the gearing 128 for the combination of the torques provided by the cyclic units 120a, 120b and the provision of an output torque at the drive output shaft 130 (see FIG. 4).

In the state illustrated in FIG. 8, in which the float bodies 116 are situated in their upper position, it is the case in one embodiment that each float body 116 is fixed with respect to the deformable element 100, for example by means of the first locking mechanism 135 described with reference to FIG. 5, for example by the locking elements 136, 138.

The second locking mechanism 153 holds the mutually opposite side walls 108c, 108d of the upper segments 102a, 102d locked, and as described above, as a result of the configuration of the cyclic unit 120a, 120b, indirectly also holds the mutually opposite side walls 108f, 108e of the lower segments 102b, 102c locked, until the two float bodies 116 have passed into their upper position (FIG. 8). When the float bodies 116 have arrived in their upper position, the first locking mechanism 135 is actuated in order to lock the two float bodies 116 to one another, thus locking the position of the float body 116 relative to its adjacent deformable element, for example relative to its adjacent segment of the deformable element 100.

Now, the second locking mechanism 153 is placed into its releasing position in order to release the first locking elements 154.

In the configuration in FIG. 8, the float bodies 116 situated at the top have a higher density ($\rho_{FT}$=106 kg/m$^3$) than the filled lower segments 102b, 102c ($\rho_{FLBF}$=23 kg/m$^3$).

As a result of said density difference, the center of gravity of the two cyclic units 120a, 120b is situated above the drive elements and above the axis 106. As a result, the cyclic units locked by the first locking device move downward together with the float bodies 116, for example in a counter-clockwise rotation 164 as indicated in FIG. 8. It is self-evident that the rotational movement may also take place in the opposite direction, counter to the counter-clockwise rotation 164. In one embodiment, it may be provided that, upon the release of the side walls 108c, 108d, the second locking mechanism 153, for example the second locking element 156, exerts on the cyclic units 120a, 120b a torque which leads to a rotation of the cyclic units 120a, 120b as indicated in FIG. 8 by the arrows 164.

In one embodiment, the entirety of the float bodies 116 and segments 102a, 102b, 102c, 102d is referred to as main body. In this respect, the rotation 164 may also be referred to as a rotation of the main body, wherein during said rotation, the elements of the main body, in particular the float bodies 116 and the segments 102a, 102b, 102c, 102d, are locked with respect to one another, such that the relative positions thereof within the main body remain unchanged.

Figure 9:
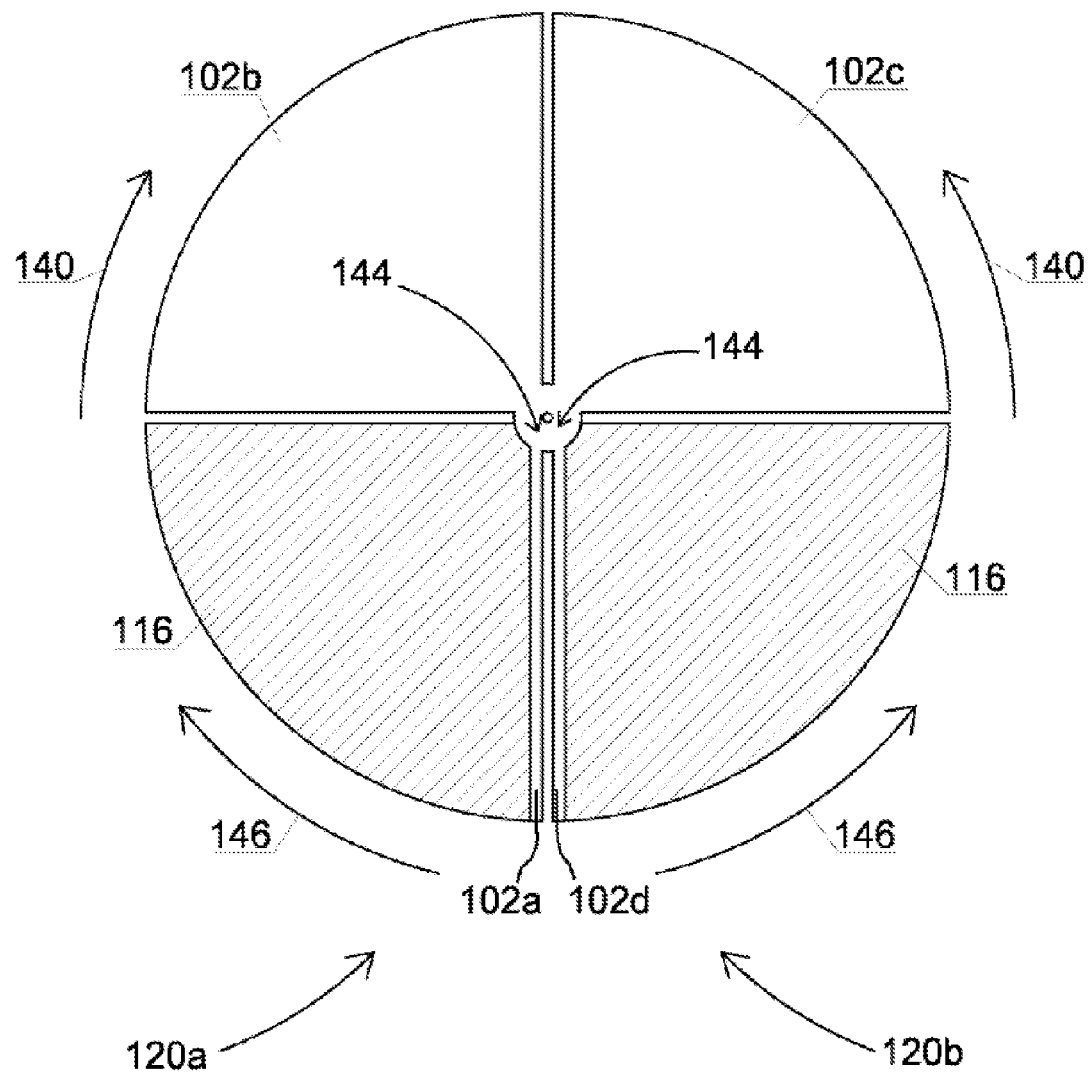
FIG. 9 shows the motor from FIG. 7 after the initial position has been assumed again.

Consequently, the cyclic units 120a, 120b move until the center of gravity of the cyclic units is situated below the axis 106 in an equilibrium position. Said position, which is an equilibrium position with respect to the center of gravity, is illustrated in FIG. 9. Said position is referred to herein generally as initial position, because it effects the initial position for an upward pivoting movement of the float bodies 116 and a compression of the upper segments (now, in FIG. 9) 102b, 102c. Before the first locking device 138 releases the two float bodies 116 and thus permits an upward movement of the float bodies, the two locking devices 153 are placed into their slid-forward position, that is to say into their locking position, again in order to spatially fix the mutually opposite side walls 108e, 108f and 108c, 108d. In order that the rotation of the cyclic units does not exceed 180°, it is the case in one embodiment that the second locking devices engage beforehand on the upwardly rotating segments 102b, 102c and then stop them at 180° rotation.

This is followed by the release of the float bodies 116 and the upward movement of the float bodies 116, the compression of the upper segments 102b, 102c and the filling of the lower segments 102a, 102d, analogously to the description of FIG. 7.

As is evident from the statements above, with the configuration of a motor according to the invention, continuous operation of the motor is consequently possible.

Figure 10:
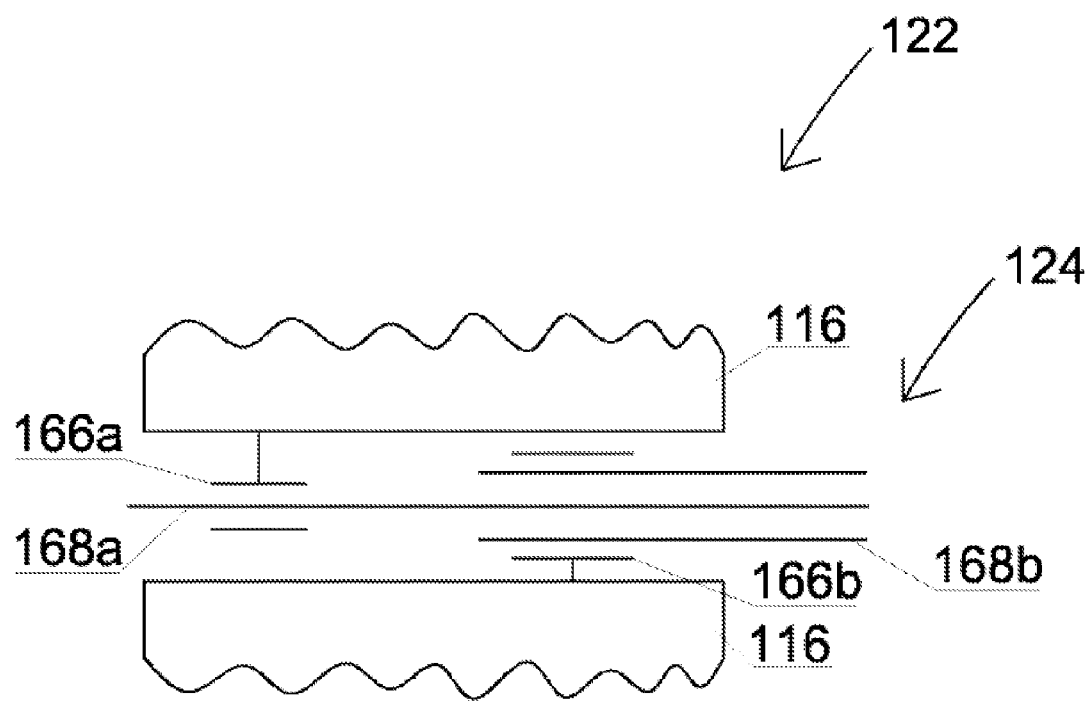
FIG. 10 shows a part of the motor from FIG. 4 as per embodiments of the subjects disclosed herein.

FIG. 10 shows a part of the motor 122 from FIG. 4 as per embodiments of the subjects disclosed herein. FIG. 10 shows a coupling device 166a, 166b designed for coupling the float body 116 to the respective drive element 168a, 168b during the upward movement of the float body 116 in order thereby to drive the drive element 166a, 166b. In one embodiment, the drive elements 168a, 168b form, for example, the shaft device 124 as has been described with reference to FIG. 4. The coupling devices 166a, 166b are for example clutches that are actuated by actuators (not illustrated). In one embodiment, the coupling devices 166a, 166b are part of a gearing which is schematically illustrated and denoted by 128 in FIG. 4. In one embodiment, a planetary gear set may be arranged radially within the cyclic units, for example in the through hole 105. In one embodiment, the drive elements 168a, 168b may be parts of the planetary gear set.

The coupling devices 166a, 166b are also designed for decoupling the float body 116 from the drive element during the driving of the cyclic unit into the initial position. Said decoupling may take place for example by opening the clutches.

In other embodiments, use may be made of other coupling devices for providing the functions described herein.

It is pointed out that the embodiments described herein constitute merely a limited selection of possible design variants of the invention. For example, it is thus possible for the features of individual embodiments to be combined with one another in a suitable way, such that, to a person skilled in the art, in addition to the design variants explicitly disclosed here, a multiplicity of different embodiments must be regarded as being obviously or implicitly disclosed. It should also be mentioned that the expressions such as "a" or "one" do not exclude a multiplicity. Expressions such as "comprising" or "having" do not exclude further features or method steps. It should also be understood that the locking mechanisms disclosed herein and/or the manner of actuation thereof are merely exemplary, and that any suitable form of locking mechanism and any suitable manner of actuation of a locking mechanism is possible and may be implemented together with the subjects disclosed herein. For example, instead of the actuators controlled by means of a control device, it may be provided that the locking mechanisms or the coupling elements are, by means of a suitable mechanical configuration, actuated automatically in purely mechanical form as a result of the operation of the motor.

It should also be understood that any entity disclosed herein (for example component, unit, mechanism or device) is not restricted to a specific entity as described in some embodiments. Rather, the subjects disclosed herein may be implemented in a variety of ways and provided with different granularities on the device plane or control module plane, as long as the desired functionality described herein is realized. It should also be understood that, in some embodiments, a separate entity may be provided for each function disclosed herein. Furthermore, in other embodiments, an entity may be provided which provides two or more functions disclosed herein. In one embodiment, the control device comprises a processor device having at least one processor for executing at least one computer program which corresponds to a corresponding software module.

In summary, the following remains to be stated:

There is disclosed a motor which uses a hydrostatic force to generate a torque which repeats cyclically owing to a displacement of the center of gravity of a cyclic unit 120a, 120b. Float bodies 116 are subject, in a fluid 134, to a buoyant lift force which causes an upward movement 146 of the float bodies and drives these into an upper position. The upward movement causes a drive element 168a, 168b to be driven. The upward movement also causes air to be forced out of upper segments 102a, 102d of a deformable element 100 into lower segments 102b, 102c, and thus causes the center of gravity of the cyclic units, which comprise the float bodies 116 and the deformable element 100, to be raised above an axis of rotation 106. When the float bodies 116 have arrived in their upper position, said elevated center of gravity position permits a rotation of the cyclic units into their initial position.

LIST OF REFERENCE SIGNS

100 Deformable element
102a, 102b, 102c, 102d Segment of 100
103 Fill medium
104 Central region
105 Through hole
106 Axis
108 Side walls of 100
110 Radially outer region of 100
112 Frame rods
113 Circumferential direction
114 Outer wall
116 Float body
118a, 118b Side wall of 116
120a, 120b Cyclic unit
122 Motor
124 Shaft device
126 Mounting arrangement of the shaft device
128 Gearing
130 Drive output shaft
132 Fluid surface
134 Fluid
135 First locking mechanism
136 First locking element of 135
138 Second locking element of 135
140 Upward movement
142 Water pressure
144 Air flow
146 Rotational movement (upward movement) of 116
150 Toothed rack
152 Pawl
153 Second locking mechanism
154 First locking element of 153
156 Second locking element of 153
158 Actuator
160 Control device
161 Sensor device
162 Control signals
163 Sensor signal
164 Rotation of the cyclic units
166a, 166b Coupling device
168a, 168b Drive element

The invention claimed is:

1. A motor comprising a rotary unit and drive element, wherein the rotary unit comprises a rigid, dimensionally stable float body;
wherein the motor is designed to generate a torque using a hydrostatic force, wherein the torque is generated on the basis of a displacement of the center of gravity of the rotary unit;
wherein the rotary unit is arranged in a liquid fluid such that the float body whose relative density is lower than the relative density of the liquid fluid is, in a lower position, subject to a buoyant lift force which drives the float body in an upward movement into an upper position and thereby drives the drive element; and
wherein the rotary unit also comprises:
a deformable element comprising a gaseous fill medium;
wherein the float body and the deformable element are arranged in the liquid fluid such that the float body compresses a first part of the deformable element during the upward movement, wherein the first part is arranged above the float body; the compression of the first part of the deformable element forces the gaseous fill medium into a second part of the deformable element, wherein the second part is arranged below the float body.

2. The motor as claimed in claim 1, wherein the float body can, in the upper position, be locked to the deformable element, thereby resulting in a locked state of the rotary unit, wherein the center of gravity of the rotary unit in its locked state, with the float body in the upper position, is situated above the drive element.

3. The motor as claimed in claim 1, also comprising a coupling device designed for coupling the float body to the drive element during the upward movement of the float body, in order thereby to drive the drive element.

4. The motor as claimed in claim 1, wherein the drive element is a rotatable element which has an axis of rotation;
wherein the deformable element and the float body are configured for selective conjoint rotation about the axis of rotation.

5. The motor as claimed in claim 4, also comprising a locking mechanism for locking the position of the float body relative to the deformable element during the conjoint rotation about the axis of rotation;
wherein the locking element is configured for unlocking the float body and the deformable element, thereby permitting a subsequent upward movement of the float body.

6. The motor as claimed in claim 1, wherein the rotary unit is a first rotary unit; and
the motor also has a second rotary unit which is configured in the manner of the rotary unit defined in one of the preceding claims; and
wherein the first rotary unit and the second rotary unit are configured for conjoint rotation about a common axis of rotation.

7. A method for operating a motor as claimed in claim 1, the method comprising:
spatially fixing the rotary unit in the lower position within a liquid fluid;
subsequently releasing the float body in the lower position in order to enable the float body to perform the upward movement to the upper position and thereby drive the drive element; and
with the float body in the upper position, placing the rotary unit into a locked state in which the float body is spatially fixed with respect to the rotary unit.

* * * * *